United States Patent [19]

Stanulonis et al.

[11] 4,285,836
[45] * Aug. 25, 1981

[54] IMPREGNATING SOLUTION FOR HYDROTREATING CATALYST MANUFACTURE AND PRODUCTION THEREOF

[75] Inventors: John J. Stanulonis, Pittsburgh; Joseph A. Tabacek, New Kensington; Roger F. Vogel, Butler, all of Pa.

[73] Assignee: Gulf Research & Development Company, Pittsburgh, Pa.

[*] Notice: The portion of the term of this patent subsequent to Aug. 25, 1998, has been disclaimed.

[21] Appl. No.: 72,241

[22] Filed: Sep. 4, 1979

[51] Int. Cl.³ .................. B01J 37/00; B01J 29/00; B01J 23/64; B01J 27/24

[52] U.S. Cl. ............................ 252/438; 252/441; 252/465; 252/466 J; 252/470

[58] Field of Search .......... 208/251 H, 254 H, 216 R, 208/216 PP, 217; 252/470, 465, 466 R, 466 J, 438, 441, 442, 458, 459

[56] References Cited

U.S. PATENT DOCUMENTS

| | | | |
|---|---|---|---|
| 3,113,921 | 12/1963 | Archibald | 208/217 |
| 3,269,938 | 8/1966 | Le Francois | 208/254 H |
| 3,434,964 | 3/1969 | Bilosoly et al. | 208/254 H |
| 3,525,684 | 8/1970 | O'Hara | 208/216 PP |
| 3,567,654 | 3/1971 | Van Dyke | 252/441 |
| 3,673,112 | 6/1972 | Levinson | 208/254 H |
| 3,998,721 | 12/1976 | O'Hara | 208/216 R |
| 4,152,251 | 5/1979 | Michelson | 252/441 |

FOREIGN PATENT DOCUMENTS 229933 7/1960 Australia ..................... 208/254 H Primary Examiner—Gary P. Straub
Attorney, Agent, or Firm—Deane E. Keith; Forrest D. Stine; Alvin E. Ring

[57] ABSTRACT

An aqueous, alkaline impregnating solution for the one-step impregnation of fluorine, nickel and molybdenum onto a catalyst support is provided by admixing nickel fluoride, preferably an ammoniacal solution of nickel fluoride and an ammoniacal solution of $Mo^{+VI}$ to form a compatible impregnating solution consisting essentially of $NH_4^+$, $Ni^{++}$, $Mo^{+VI}$ and $F^-$. Nickel and fluorine ions are present in a ratio of substantially 1 to 2. The use of nickel fluoride in a predissolved ammoniacal solution for admixture with the ammoniacal solution of the $Mo^{+VI}$ renders the resulting impregnating solution highly suitable for impregnation of fluorine, nickel and molybdenum onto a catalyst support by the incipient wetness technique in one-step. The catalyst produced using the present impregnating solution is highly active for hydrotreating lubricating oils.

14 Claims, 3 Drawing Figures

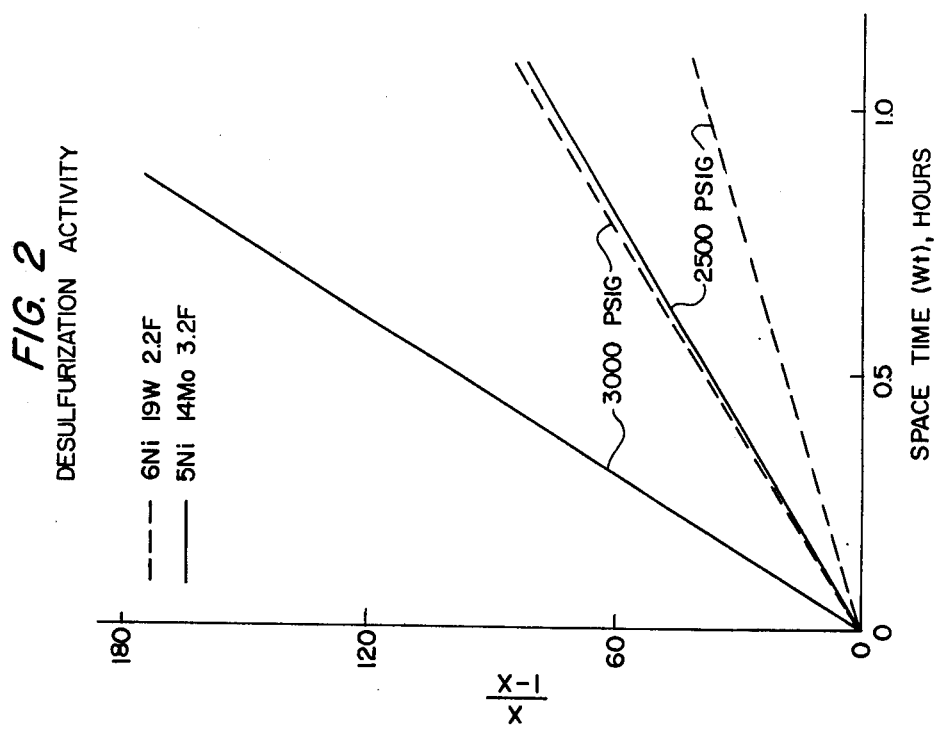
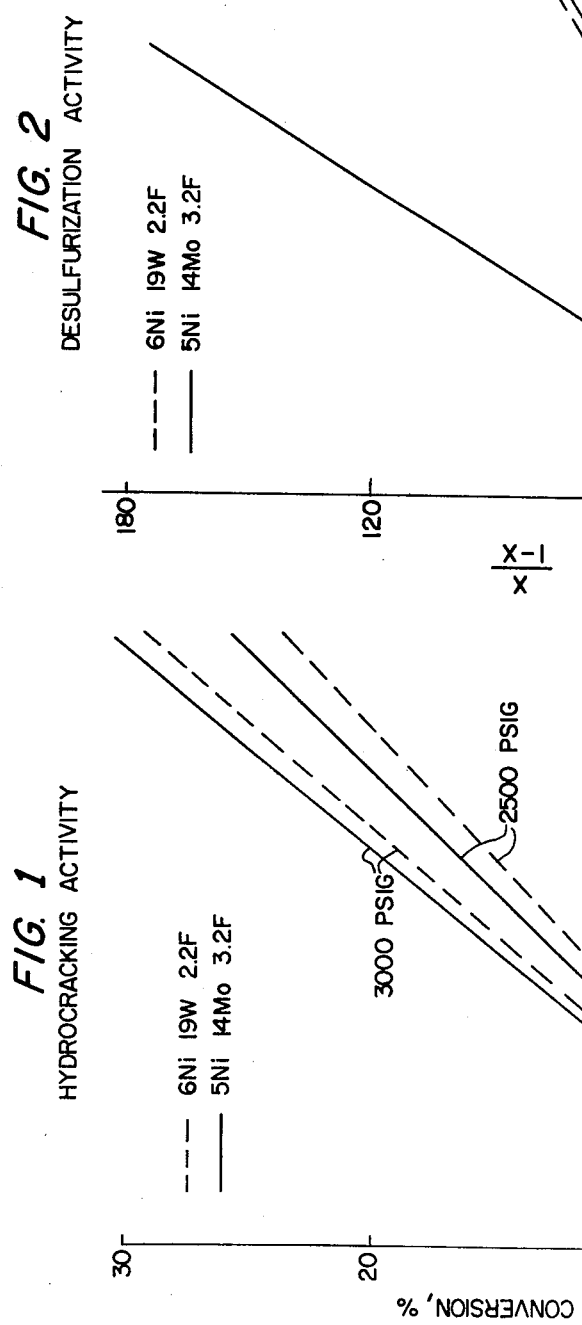

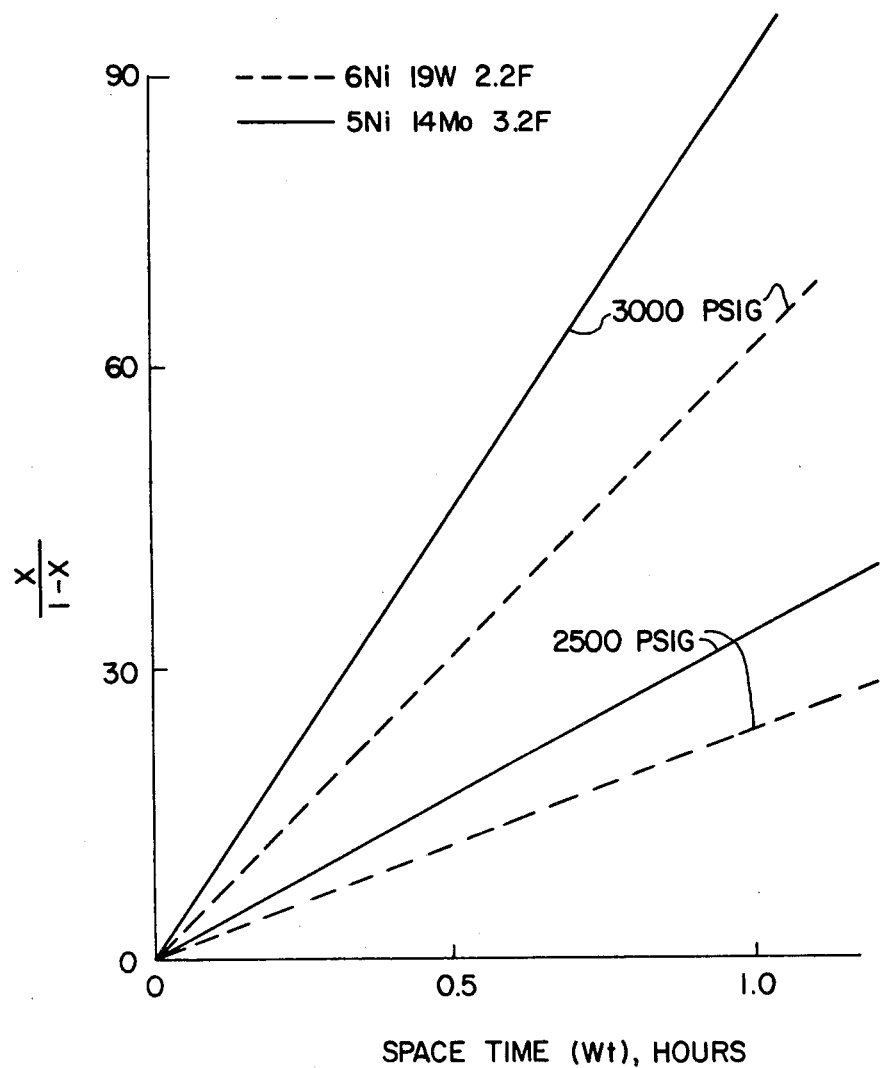

IMPREGNATING SOLUTION FOR HYDROTREATING CATALYST MANUFACTURE AND PRODUCTION THEREOF

CROSS REFERENCES TO RELATED APPLICATIONS

Reference is made to the following U.S. applications filed of even date:

U.S. patent application Ser. No. 72,240 to John J. Stanulonis, Joseph A. Tabacek and Roger F. Vogel entitled "Hydrotreating Catalyst And Manufacture Thereof".

U.S. patent application Ser. No. 72,232 to John J. Stanulonis, Joseph A. Tabacek and Roger F. Vogel entitled "Lubricating Oil Hydrotreating Process".

The foregoing applications are hereby incorporated by reference.

FIELD OF THE INVENTION

The present invention relates to an impregnation solution used in the production a hydrotreating catalyst and to the method of producing such impregnating solution. More particularly, this invention relates to an alkaline impregnating solution for producing a fluorine-promoted nickel-molybdenum catalyst in which the fluorine, nickel and molybdenum are highly compatible and may be provided in a minimum volume of solution, thus rendering the present impregnating solution highly suitable for use in the one-step impregnation of a catalyst support using the incipient wetness technique. The resulting catalyst is highly active for hydrotreating lubricating oil feedstocks.

DESCRIPTION OF THE PRIOR ART

It is well known in the art to subject lubricating oil feedstocks to treatment with hydrogen under elevated temperatures and pressures while in contact with a catalyst in order to provide a lubricating oil having an improved viscosity index while removing sulfur and nitrogen. The term "hydrotreating" has been employed, and is employed herein to describe a processing technique more severe than hydrogenation, wherein saturation of unsaturated materials such as aromatics is effected, although substantially less severe than hydrocracking, which results in an extremely high conversion to materials boiling below the boiling range of the feedstock.

The catalyst normally required in a hydrotreating process must possess cracking activity and a particular type of activity termed "ring scission activity". The degree of cracking and ring scission activity is dependent upon the feedstock and the product desired. Thus, a hydrotreating process normally causes a substantial molecular rearrangement as compared to hydrogenation, but does not cause the extensive and somewhat random breakdown of molecules that results in a hydrocracking process. Hydrotreating causes substantially complete saturation of aromatics, and the reactions are believed to follow the course of converting condensed aromatics to condensed naphthenes followed by selective cracking of the condensed naphthenes to form alkylnaphthenes. Polynuclear cyclic compounds are attacked and the rings are opened, while mononuclear cyclic compounds are not substantially affected. The alkyl side chains formed by opening the rings are not further reacted to sever the alkyl side chains. Additionally, hydrotreating is effective to remove heteroatoms, such as sulfur, nitrogen and oxygen. In short, a hydrotreating process removes heteroatoms, reduces the quantity of aromatics and polynuclear cyclic compounds and increases the quantity of alkylnaphthenes, thereby enhancing the quality of the material treated, reducing its bromine number and increasing its viscosity index (VI).

Typically, hydrotreating catalysts contain components selected from Group VI and Group VIII metals, their oxides and sulfides, supported on a carrier having cracking activity. For example, a commercial catalyst that has been employed for hydrotreating a lube oil feedstock is fluorine-promoted nickel-tungsten on a silica-alumina carrier. Such hydrotreating catalyst is highly active for improving the viscosity index of lube oil feedstocks, and has high desulfurization and denitrogenation activities. The catalyst is promoted with a halogen, such as fluorine, in order to enhance the cracking activity of the catalyst.

Various techniques have been utilized for depositing the metals and the fluorine onto the catalyst support, such as precipitation, impregnation, or the like. The catalyst is heated for drying, and thereafter calcined by heating at elevated temperatures. The preparation of fluorine-promoted nickel-tungsten catalysts by impregnation of a suitable support from impregnating solutions has involved the use of hydrogen fluoride or ammonium fluoride to supply the fluorine to the impregnating solution, since such compounds are compatible with the nickel nitrate and tungsten compounds that have been employed to provide the metals to such impregnating solution.

Because tungsten is an expensive component in a lubricating oil catalyst, it would be advantageous to provide an active lube oil hydrotreating catalyst which does not contain tungsten. It would be especially desirable to provide an active hydrotreating catalyst in which the tungsten is replaced by less expensive molybdenum. Moreover, it would be desirable to provide a hydrotreating catalyst prepared from an impregnation solution produced from fewer compounds than were previously required and still provide a compatible impregnating solution.

SUMMARY OF THE INVENTION

It has now been found that an alkaline impregnating solution for the one-step impregnation of fluorine, nickel and molybdenum on a catalyst support can be produced by a relatively simple procedure using fewer compounds than previously required. The impregnating solution provides a fluorine-promoted NiMo catalyst that is tungsten-free, but has activity for hydrocracking, desulfurization and denitrogenation of a lube oil feedstock when is greater than that provided by a fluorine-promoted nickel-tungsten hydrotreating catalyst, which is a common commercial hydrotreating catalyst composite, while providing a lube oil product having a comparable viscosity index.

The impregnating solution of the present invention is prepared by admixing nickel fluoride, preferably predissolved nickel fluoride, i.e., an ammoniacal solution of nickel fluoride, with an ammoniacal solution of a $Mo^{+VI}$ oxide to form an ammoniacal impregnating solution consisting essentially of $NH_4^+$, $Ni^{++}$, $Mo^{+VI}$ and $F^-$ in which the nickel, molybdenum and fluorine are compatible.

The impregnating solution is applied to the supporting material in a single-step employing the "incipient wetness" technique of impregnation. Thus, a predetermined volume of the present impregnating solution containing fluorine, nickel and molybdenum in a desired ratio is utilized to impregnate the catalyst support, and there is virtually no excess liquid.

Thereafter, the catalyst is heated so as to drive off the alkaline component, e.g., ammonia, and reduce the pH to trigger the deposition of the metals and fluorine from the impregnating solution onto the support, and then to drive off the water and dry the catalyst composite.

The resulting fluorine-promoted NiMo catalyst composite constitutes a highly active hydrotreating catalyst for enhancing the properties of lubricating oil feedstocks.

DESCRIPTION OF THE PREFERRED INVENTION

The impregnating solution of the present invention consists essentially of an admixture of (A) an ammoniacal solution of nickel fluoride and (B) an ammoniacal solution of a $Mo^{+VI}$ oxide. The ammoniacal solution of nickel fluoride may be prepared by completely dissolving the required amount of nickel fluoride in ammonium hydroxide so that all of the nickel and all of the fluorine in the final catalyst are derived from nickel fluoride. Thus, it is preferred that the ions, $Ni^{++}$ and $F^-$ be present in the impregnating solution in a stoichiometric ratio of substantially 1 to 2, and that the nickel fluoride supply all of the nickel and fluorine present in the impregnating solution. The term "nickel fluoride" as used herein includes both nickel fluoride, $NiF_2$, and suitable hydrates thereof, such as $NiF_2.4H_2O$. The ammoniacal solution of the $Mo^{+VI}$ oxide is separately prepared. A suitable ammoniacal solution of the $Mo^{+VI}$ oxide, comprises, for example, an aqueous solution of ammonium heptamolybdate, $(NH_4)_6Mo_7O_{24}.4H_2O$ in ammonium hydroxide or may be provided, for example, by dissolving molybdenum trioxide or molybdic acid in ammonium hydroxide.

The impregnating solution can be produced by admixing the ammoniacal solution of the nickel fluoride with the ammoniacal solution of the $Mo^{+VI}$ oxide under any suitable conditions. Preferably, the respective ammoniacal solutions are admixed under ambient temperature and pressure conditions. However, any temperature and pressure conditions can be employed at which vaporization of the alkaline component, e.g., ammonia, and water is avoided and at which salts remain in solution.

It is essential that an alkaline, ammoniacal impregnating solution of the nickel fluoride and the molybdenum oxide be employed. As used herein, the term "ammoniacal" includes ammonia or an ammonia derivative having the properties of ammonia for the purposes of the present invention, namely: (a) the ability in aqueous solution to dissolve both the nickel fluoride and molybdenum oxides of the present invention; (b) a boiling point below that of water; and (c) it will not leave a residue on the catalyst on heating which will interfere with the catalyst activity. Ammonia is the preferred alkaline component of the impregnating solution, because it is inexpensive and leaves the impregnating solution readily on heating.

When the catalyst support is immersed in an ammoniacal impregnating solution and then heated, the alkaline component, e.g., ammonia, is advantageously driven off prior to the water in the impregnating solution. As soon as ammonia is driven from the catalyst, the pH of the impregnating solution falls, and the nickel, fluorine and molybdenum are thereby deposited on the catalyst support in the desired spacial arrangement.

As indicated previously, the catalyst support is impregnated with the impregnating solution of the present invention in a single step, while employing the "incipient wetness" technique. Such technique is well known and requires that the volume of impregnating solution be predetermined so as to provide the minimum volume which will just wet the entire surface of the support, with no excess liquid. Accordingly, since the impregnating solvent is utilized in a one-step impregnation of the catalyst support, it is necessary that the impregnating solution contain the amounts of fluorine, nickel and molybdenum that are required in the final catalyst composite.

When preparing the impregnating solution, the nickel fluoride may be added directly to the ammoniacal solution of the molybdenum oxide or it may be predissolved in a separate ammoniacal solution, e.g., ammonium hydroxide, and then subsequently admixed with the ammoniacal $Mo^{+VI}$ oxide solution. Preferably, the nickel fluoride is predissolved in an ammoniacal solution prior to admixture with the ammoniacal $Mo^{+VI}$ oxide solution.

Any suitable support material may be employed, including those refractory inorganic oxides conventionally used for hydrotreating catalysts, including supports having cracking activity and comprising a plurality of oxides, including, silica-alumina, silicamagnesia, silica-zirconia, silica-alumina-magnesia, and the like. The preferred support is silica-alumina. A particularly preferred silica-alumina contains between about 10 and 75 weight percent silica, preferably between about 30 and 75 weight percent silica, the remainder being alumina.

The volume of impregnating solution is predetermined so as to utilize a minimal volume for the one-step impregnation, which volume of impregnating solution must contain the amount of nickel, molybdenum and fluorine required for the final catalyst. The required volume will depend upon the surface area and pore volume of the support. The determination of this volume is well within the skill of the art. Suitable amounts of nickel, molybdenum and fluorine for the hydrotreating catalyst include, for example, between about 2 and about 8, preferably between about 4 and about 7 weight percent of nickel, and between about 8 and about 25, preferably between about 12 and about 18 percent by weight of molybdenum, and between about 1 and about 5, preferably between about 2 and about 3.5 weight percent of fluorine, based upon the total catalyst composite. An especially preferred catalyst is one containing 5 percent nickel, 14 percent molybdenum and 3.2 percent fluorine on a silica-alumina cracking support. In this application, the quantity of metal is reported as atomic metal, and the quantity of fluorine is reported as atomic fluorine.

After the catalyst support is impregnated in a single step, the support material bearing the impregnating solution is dried at a temperature adequate to remove non-combined water, and thereafter calcined by, for example, heating the impregnated catalyst in an oxygen-containing atmosphere, for example, air to a temperature between about 500° F. (260° C.) and about 1500° F. (816° C.), preferably between about 900° F. (482° C.)

and about 1200° F. (649° C.), for a period of from about 1 to about 10 hours or more.

The hydrotreating process of the present invention may be utilized for hydrotreating any lubricating oil feedstock including, for example, a distillate oil, a solvent treated distillate oil, a solvent treated residual oil, a synthetic fraction, or the like. Such feedstocks may have, for example, a boiling range at least above about 600° F. (316° C.) and preferably above about 625° to 650° F. (329° to 343° C.), and may boil up to about 950° to 1000° F. (510° to 538° C.).

Any suitable hydrotreating process conditions may be utilized including a hydrogen partial pressure of 1500 to 3000 pounds per square inch (105 to 210 kg/cm$^2$), generally, 2000 to 2500 pounds per square inch (140 to 175 kg/cm$^2$) more preferably.

The gas circulation rate can be between about 1000 to 10,000 standard cubic feet per barrel of gas (178 and 1780 cubic meters/cubic meter), generally, or preferably between about 4000 and about 7000 standard cubic feed per barrel of gas (712 and 1246 kg/cm$^2$) preferably containing 70 percent or more of hydrogen. Reactor temperatures can range between about 600° F. (316° C.) and about 800° F. (427° C.) generally, and between about 650° F. (343° C.) and about 750° F. (399° C.), preferably. The liquid hourly space velocity can be between about 0.2 and 2, generally, or between about 0.5 and 1.25 volumes of oil per volume of catalyst per hour, preferably.

FIG. 1 shows a comparison between the hydrocracking activity of the catalyst of the present invention and that of a tungsten-containing catalyst.

FIG. 2 shows a comparison between the desulfurization activity of the catalyst of the present invention and that of a tungsten-containing catalyst for desulfurization of a lube oil feedstock.

FIG. 3 shows a comparison between the denitrogenation activity of the catalyst of the present invention and that of a tungsten-containing catalyst for denitrogenation a lube oil feedstock.

The following examples illustrate the present invention and are not intended to limit the invention, but rather, are presented merely for the purposes of illustration.

EXAMPLE 1

Preparation of Impregnation Solution

An ammoniacal solution of nickel fluoride is prepared by dissolving 15.85 grams of 98.5 percent NiF$_2$.4H$_2$O in concentrated ammonium hydroxide and diluting to about 40 ml. with concentrated ammonium hydroxide to form a solution A. Meanwhile, 29.94 grams of ammonium heptamolybdate, (NH$_4$)$_6$Mo$_7$O$_{24}$.4H$_2$O (81.5 percent MoO$_3$) were contacted with distilled water and 13.1 ml. of concentrated ammonium hydroxide and then diluted with distilled water to form approximately 45 ml. of a solution B.

Solution A was admixed with solution B to form an impregnating solution having a pH of 8.8.

EXAMPLE 2

Preparation Of Impregnated Catalyst

A catalyst was prepared by employing 77.18 grams of calcined silica-alumina containing 60 percent by weight Al$_2$O$_3$ and 40 percent by SiO$_2$. The silica-alumina particles were contacted with the admixture of solutions A and B as prepared in Example 1 using a one-step incipient wetness impregnation, which requires 85 ml. of the impregnation solution. The catalyst support was contacted with the impregnating solution under ambient conditions. Next, the impregnated mass was oven dried at 248° F. (120° C.) for approximately 26 hours. Thereafter, the dried mass was calcined in air at 1000° F. (538° C.) for 10 hours.

The resulting catalyst composition contained 5 weight percent nickel, 14 weight percent molybdenum and 3.2 weight percent fluorine, based on total catalyst weight.

EXAMPLES 3-6

Tests were conducted to ascertain the activity of the tungsten-free nickel-molybdenum-fluorine catalyst prepared as in Example 2 for hydrotreating a lubricating oil feedstock, as compared with the activity of a nickel-tungsten-fluorine catalyst under similar conditions.

The feedstock was a Kuwait heavy distillate having the following inspections:

| | |
|---|---|
| Gravity, °API | 18.4 |
| Viscosity, SUV, Sec | |
| 150° F. (66° C.) | 399 |
| 210° F. (99° C.) | 111.4 |
| Color, ASTM D1500 | <3.5 dil. |
| Flash Point, D92, °F. (°C.) | 560 (293) |
| Pour Point, D97, °F. (°C.) | +125 (52) |
| Iodine Number | 15.0 |
| Carbon Residue, D524, Wt. % | 0.99 |
| Nitrogen, Total, ppm | 1300 |
| Sulfur, D1552, Wt. % | 3.42 |
| Carbon, Wt. % | 84.59 |
| Hydrogen, Wt. % | 11.88 |
| Distillation, D1160 | |
| 5% condensed, °F. (°C.) | 925 (496) |
| 10 | 946 (508) |
| 30 | 972 (522) |

In these tests, separate portions of the heavy distillate were hydrotreated in independent runs at a temperature of 720° F. (382° C.) in a one-stage reactor employing a hydrogen rate of 7500 SCF/B (1335 cubic meters/cubic meter) at a liquid hourly space velocity of 1 volume of oil per volume of catalyst per hour. One portion of the feed oil was passed with hydrogen through the one-stage reactor containing catalyst particles comprising 6 weight percent nickel, 19 weight percent tungsten and 2.2 weight percent fluorine on a silica-alumina support comprising 60 weight percent alumina and 40 weight percent silica (Catalyst A), operated under 3000 psig (210 kg/cm$^2$) total reactor pressure. Hydrotreated product samples were taken, and then the total reactor pressure was reduced to 2500 psig (175 kg/cm$^2$). After conditions stabilized, further product samples were taken.

Another portion of the feed oil was passed through the one-stage reactor under identical conditions including a total reactor pressure of 3000 psig (210 kg/cm$^2$), but containing the catalyst of the present invention (Catalyst B) as produced according to Example 2 in the form of particles containing 5 weight percent nickel, 14 weight percent molybdenum and 3.2 weight percent fluorine on the same silica-alumina support as used with tungsten-containing catalyst. As before, hydrotreated product samples were taken at 3000 psig (210 kg/cm$^2$) and then the total reactor pressure was reduced to 2500 psig (175 kg/cm$^2$). After the process conditions stabilized, further samples of the product were taken.

The product samples were then distilled to yield a 650° F.+ (343° C.+) bottoms, the bottoms were dewaxed and the 650° F.+ (343° C.+) dewaxed bottoms material was inspected for viscosity index, nitrogen and sulfur and hydrocracking activity. The yield and viscosity index for the various samples are shown in Table I below:

TABLE I

| Example Nos. | Catalyst | Pressure psig (kg/cm$^2$) | Yield (Volume %) | Viscosity Index (VI) |
|---|---|---|---|---|
| 3 | A | 3000 (210) | 70.4 | 92 |
| 4 | B | " | 74.6 | 88 |
| 5 | A | 2500 (175) | 76.8 | 87 |
| 6 | B | " | 78.5 | 81 |

Table I shows that the tungsten-free catalyst of the present invention (Catalyst B) is capable of producing high yields of a lubricating oil having an improved VI, and is comparable to a tungsten-containing catalyst, particularly in view of the lower metals content of catalyst B.

The hydrocracking activity of Catalysts A and B is shown in Table II, below, where hydrocracking activity of the tungsten-containing catalyst is compared with the present tungsten-free catalyst on a weight basis:

TABLE II

| Catalyst | Pressure psig(kg/cm$^2$) | Conversion %, (100-Wt. % of Dewaxed Oil) |
|---|---|---|
| A | 2500 (175) | 19 |
| B | " | 21 |
| A | 3000 (210) | 24 |
| B | " | 24.5 |

Table II shows that the tungsten-free catalyst of the present invention (B) provides improved hydrocracking activity as compared with the tungsten-containing catalyst at a space time of 1. This hydrocracking advantage is also shown in FIG. 1, wherein hydrocracking activity is illustrated by a graph showing the percent conversion, indicated as 100-weight percent of dewaxed oil.

The fraction of sulfur removed (X) on a weight basis by the tungsten-free, fluorine-promoted NiMo catalyst of the present invention was measured and compared with that of the NiWF catalyst. The second order kinetics concentration parameter (X/1-X) for each catalyst for desulfurization is compared at a space time of 1 in the following table:

TABLE III

| Catalyst | Pressure psig(kg/cm$^2$) | X/1-X |
|---|---|---|
| A | 2500 (175) | 40 |
| B | " | 80 |
| A | 3000 (210) | 85 |
| B | " | 205 |

As seen in Table III, the catalyst (B) of the present invention provides a desulfurization activity (X/1-X) for the lubricating oil feedstock which is at least twice that of the tungsten-containing hydrotreating catalyst. FIG. 2 also shows the dramatic increase in desulfurization activity provided by the present tungsten-free catalyst as compared with the NiWF catalyst.

The fraction of nitrogen removed (X) on a weight basis by the tungsten-free, fluorine-promoted NiMo catalyst of the present invention was measured and compared with that of the NiWF catalyst. The second order kinetic concentration parameter (X/1-X) for each catalyst for denitrogenation is compared at a space time of 1 in the following table:

TABLE IV

| Catalyst | Pressure psig (kg/cm$^2$) | X/1-X |
|---|---|---|
| A | 2500 (175) | 23 |
| B | " | 33 |
| A | 3000 (210) | 62 |
| B | " | 93 |

As seen in the foregoing Table IV, the catalyst (B) of the present invention has a denitrogenation activity (X/1-X) for the lubricating oil feedstock which is significantly greater than that obtained using the fluorine-promoted NiW catalyst at a space time of 1. The improved denitrogenation activity is also shown in FIG. 3 wherein the denitrogenation activity of the present fluorine-promoted NiMo catalyst is shown to provide an improved denitrogenation of the lube oil as compared with the fluorine-promoted NiW at both 2500 psig (175 kg/cm$^2$) and 3000 psig (210 kg/cm$^2$).

Although the invention has been described in considerable detail with particular reference to certain preferred embodiments thereof, variations and modifications can be effected within the spirit and scope of the invention as described hereinbefore, and as defined in the appended claims.

We claim:

1. A process for the formation of an aqueous, alkaline impregnating solution for the one-step impregnation of nickel and molybdenum onto a catalyst support, which process consists essentially of admixing
   (A) nickel fluoride, and
   (B) an ammoniacal solution of Mo$^{+VI}$, to form an impregnating solution consisting essentially of NH$_4^+$, F$^-$, Ni$^{++}$ and Mo$^{+VI}$ in amounts sufficient to produce a supported catalyst composite containing between about 2 and about 8 weight percent nickel, between about 8 and about 25 weight percent molybdenum and between about 1 and about 5 weight percent fluorine based upon the total catalyst composite when using the one-step, incipient wetness technique.

2. The process of claim 1, wherein said process consists essentially of admixing
   (A) an ammoniacal solution of nickel fluoride, and
   (B) an ammoniacal solution of Mo$^{+VI}$.

3. The process of claim 2, wherein said ammoniacal solution of nickel fluoride is nickel fluoride dissolved in ammonium hydroxide.

4. The process of claim 1, wherein said Mo$^{+VI}$ is supplied from molybdenum trioxide, molybdic acid or ammonium heptamolybdate.

5. The process of claim 1, wherein all said Ni$^{++}$ and F$^-$ are supplied from nickel fluoride.

6. The process of claim 1, wherein nickel is the sole Group VIII metal present in said impregnating solution.

7. The process of claim 1, wherein said impregnating solution is essentially tungsten-free.

8. An aqueous, alkaline impregnating solution for the one-step impregnation of fluorine, nickel and molybdenum onto a catalyst support, which consists essentially of an alkaline admixture of an ammoniacal solution of nickel fluoride and Mo$^{+VI}$, said solution consisting essentially of NH$_4^+$, F$^-$, Ni$^{++}$ and Mo$^{+VI}$ in a compatible solution in amounts sufficient to produce a supported catalyst composite containing between about 2 and about 8 weight percent nickel, between about 8 and about 25 weight percent molybdenum and between about 1 and about 5 weight percent fluorine based upon the total catalyst composite when using the one-step, incipient wetness technique.

9. The impregnating solutiion of claim 8, wherein said admixture consists essentially of (A) an ammoniacal solution of nickel fluoride, and (B) an ammoniacal solution of $Mo^{+VI}$.

10. The impregnating solution of claim 9, wherein said ammoniacal solution of nickel fluoride is nickel fluoride dissolved in ammonium hydroxide.

11. The impregnating solution of claim 9, wherein said $Mo^{+VI}$ is supplied from molybdenum trioxide, molybdic acid or ammonium heptamolybdate.

12. The impregnating solution of claim 9, wherein said ammoniacal solution of nickel fluoride provides all of the nickel and fluorine supplied to the impregnating solution.

13. The impregnating solution of claim 8, wherein all of said $Ni^{++}$ and $F^-$ are supplied from nickel fluoride.

14. The impregnating solution of claim 8, wherein said impregnating solution is essentially tungsten-free.

* * * * *

UNITED STATES PATENT AND TRADEMARK OFFICE
CERTIFICATE OF CORRECTION

PATENT NO. : 4,285,836
DATED : August 25, 1981
INVENTOR(S) : J.J. Stanulonis, J.A. Tabacek and R.F. Vogel It is certified that error appears in the above-identified patent and that said Letters Patent are hereby corrected as shown below:

Column 1, line 22, "production a" should read --production of a--;

Column 3, line 34, "$NiF_2.4H_2O$" should read --$NiF_2 \cdot 4H_2O$--;

line 38, "$(NH_4)_6Mo_7O_{24}.4H_2O$" should read --$(NH_4)_6Mo_7O_{24} \cdot 4H_2O$--;

Column 4, line 32, "silicamagnesia" should read --silica-magnesia--;

Column 5, line 21, "feed" should read --feet--;

line 49, "$NiF_2.4H_2O$" should read --$NiF_2 \cdot 4H_2O$--;

line 53, "$(NH_4)_6Mo_7O_{24}.4H_2O$" should read --$(NH_4)_6Mo_7O_{24} \cdot 4H_2O$--;

line 64, "by $SiO_2$" should read --by weight $SiO_2$--;

Column 8, line 57, "ni" should read --Ni--.

Signed and Sealed this

Ninth Day of February 1982

[SEAL]

Attest:

GERALD J. MOSSINGHOFF

Attesting Officer

Commissioner of Patents and Trademarks